United States Patent [19]

Morikawa

[11] Patent Number: 5,078,107
[45] Date of Patent: Jan. 7, 1992

[54] FUEL INJECTION CONTROL SYSTEM FOR AN INTERNAL COMBUSTION ENGINE

[75] Inventor: Koji Morikawa, Tokyo, Japan

[73] Assignee: Fuji Jukogyo Kabushiki Kaisha, Tokyo, Japan

[21] Appl. No.: 676,831

[22] Filed: Mar. 28, 1991

[30] Foreign Application Priority Data

Mar. 30, 1990 [JP] Japan .................. 2-83745
Mar. 31, 1990 [JP] Japan .................. 2-86633

[51] Int. Cl.⁵ .............. F02M 45/02; F02M 51/00; F02D 41/34
[52] U.S. Cl. .................. 123/295; 123/299; 123/305
[58] Field of Search .......... 123/295, 298, 299, 300, 123/305, 430, 478

[56] References Cited

U.S. PATENT DOCUMENTS

| | | | |
|---|---|---|---|
| 2,483,288 | 9/1949 | Malin | 123/298 |
| 2,484,009 | 10/1949 | Barber | 123/295 |
| 3,154,059 | 10/1964 | Witzky et al. | 123/295 X |
| 4,111,177 | 9/1978 | Regueiro | 123/295 X |
| 4,949,689 | 8/1990 | Schlunke | 123/295 |
| 5,050,551 | 9/1991 | Morikawa | 123/305 |

FOREIGN PATENT DOCUMENTS 3248713 7/1984 Fed. Rep. of Germany ...... 123/295
60-36719 2/1985 Japan.

Primary Examiner—Willis R. Wolfe
Attorney, Agent, or Firm—Martin A. Farber

[57] ABSTRACT

A system for controlling fuel injection for an internal combustion engine has a fuel injector provided for injecting fuel directly in a cylinder. A fuel injection quantity determined by engine operating conditions is compared with a smaller reference value corresponding to a stratified charge and with a larger reference value corresponding to a homogeneous charge. A combined mode signal is produced when the determined fuel quantity is between the smaller and larger reference values. A stratified charge is determined in a low and middle engine load range, and a homogeneous charge is determined in a heavy engine load range. In response to the combined mode signal, a combined mode charge is determined, where the fuel is injected in twice at a former injection timing and a latter injection timing in the compression stroke.

4 Claims, 8 Drawing Sheets

FUEL INJECTION CONTROL SYSTEM FOR AN INTERNAL COMBUSTION ENGINE

BACKGROUND OF THE INVENTION

The present invention relates to a system for controlling injection of fuel for an internal combustion engine with a direct fuel injection system where a combustion process is changed from a mode to another mode as well as the quantity of injected fuel, and more particularly to the system for smoothly controlling power characteristics when a combustion mode is changed.

In the direct fuel injection system for the engine, highly pressurized fuel is directly injected into a cylinder of the engine during a compression stroke and then mixture is ignited by a spark plug. The applicant of the present invention has proposed the fuel injection system where fuel injection is advanced so as to provide a homogeneous charge and retarded to provide a stratified charge. The system is so designed that the combustion process changes from a stratified charge combustion to a homogeneous charge combustion at a point where the engine torque obtained through the two combustion modes smoothly changes.

However, atmospheric conditions such as atmospheric pressure, temperature and humidity change, or elements of the fuel injection system deteriorate with time. As a result, the actual engine torque differs from the theoretically obtained engine torque, so that the engine torque changes stepwise at the combustion mode changing point, thereby impairing smooth driving.

Japanese Patent Application Laid-Open 60-36719 discloses a fuel injection system where density of intake air is detected. When the intake air density increases, the point where the stratified charge combustion is changed to the homogeneous charge combustion is shifted to a light engine load side. The point is shifted to a heavy engine load side in case the intake air density decreases. However, the system requires an intake air density sensor, and in addition, cannot cope with the problems caused by the deterioration with time. Although the combustion efficiency may be improved, smooth engine torque variation cannot be obtained because the combustion changing point of the combustion process is shifted by the control operation of the system. The combustion mode changing point is set at a point where an optimum combustion efficiency may be obtained. Therefore shifting the combustion mode changing point affects the combustion efficiency of the engine.

SUMMARY OF THE INVENTION

The object of the present invention is to provide a fuel injection system for an internal combustion engine where the combustion process changes without causing sudden change in engine torque despite the change in the engine torque characteristic due to change of various driving conditions.

The system of the present invention is characterized in that a combined mode combustion range is provided between the stratified charge combustion and the homogeneous charge combustion range.

According to the present invention, there is provide a system for controlling fuel injection for an internal combustion engine having a cylinder, a fuel injector for injecting fuel directly in the cylinder, detector means for detecting engine speed and load on the engine and for producing an operating condition signal, fuel injection quantity determining means responsive to the operating condition signal for determining a quantity of the fuel, injection timing means responsive to the operating condition signal and the quantity of the fuel for determining a timing for injecting the fuel, and driving means for operating the fuel injector to inject the fuel by the determined fuel quantity at the determined injection timing.

The system comprises combustion mode determining means for comparing the determined fuel quantity with a smaller reference value corresponding to a stratified charge and with a larger reference value corresponding to a homogeneous charge and for producing a combined mode signal when the determined fuel quantity is between the smaller and larger reference values, the injection timing means responsive to the engine operating condition signal representing a low and middle engine load for determining the injection timing at a latter period of compression for providing the stratified charge, and responsive to the engine operating condition signal representing a heavy engine load for determining the injection timing at a former period of the compression for providing the homogeneous charge, twice-injection timing means responsive to the combined mode signal for determining a former injection timing and a latter injection timing in the compression, whereby the fuel is injected twice to provide the stratified charge combustion and the homogeneous charge combustion.

These and other objects and features of this invention will become understood from the following description with reference to the accompanying drawings.

DETAILED DESCRIPTION OF THE PREFERRED EMBODIMENTS

Figure 1:
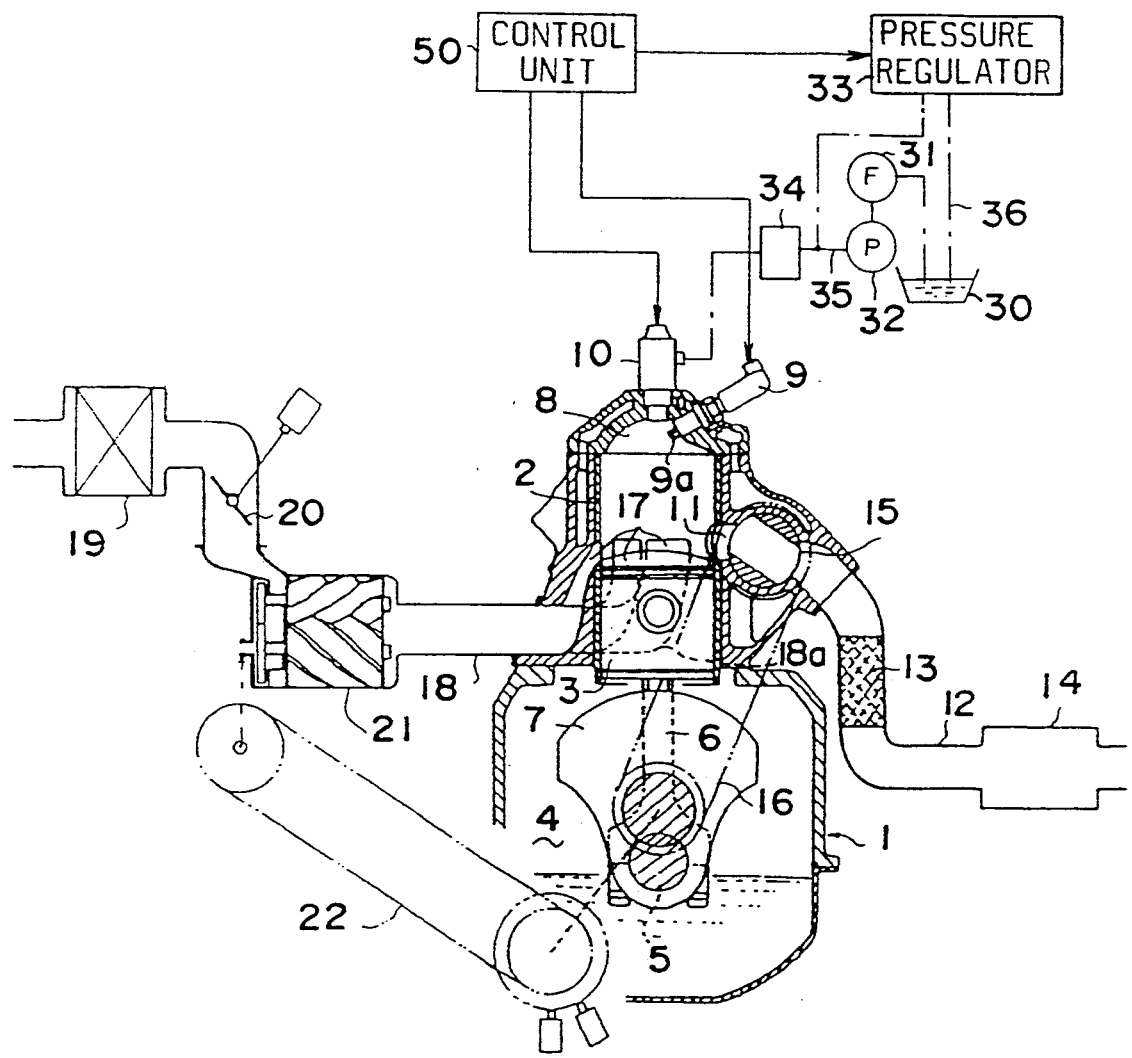
FIG. 1 shows a schematic diagram of a two-cycle engine according to the present invention.

Referring to FIG. 1, a two-cycle engine 1 for a motor vehicle comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to cancel inertia of the piston 3 reciprocating in the cylinder 2.

In a wall of the cylinder 2, an exhaust port 11 is formed and three scavenge ports 17 are formed, each scavenge port 17 being angularly spaced from each other about 90 degrees and one of them opposing the exhaust port 11. The scavenge ports 17 are connected to branches 18a of an intake pipe 18. The ports 11 and 17 are adapted to open at a predetermined timing with respect to the position of the piston 3.

A fuel injector 10 and a spark plug 9 are provided on a top of a combustion chamber 8 of the cylinder 2. The spark plug 9 is so inclined as to position a plug gap 9a thereof directly under the injector 10. The distance between the injector 10 and the plug gap 9a is determined based on the condition of the injected fuel having a shape of a cone, which is injected immediately before the ignition in low and middle engine load ranges. That is to say, if the distance is too short, the fuel is insufficiently atomized. To the contrary, if the distance is too long, the fuel spray is dispersed. By appropriately adjusting the distance, it becomes possible to provided a stratified charge wherein the conical fuel spray is ignited at a rear portion of the spray.

Moreover, the fuel injector 10 is positioned substantially on the vertical center line of the cylinder 2. Hence a large quantity of fuel, which is injected at earlier timing in a heavy engine load range, is quickly diffused to achieve homogeneous air-fuel mixture. A control unit 50 is provided for controlling the quantity of the injected fuel, the injection timing, and the ignition timing.

The combustion chamber 8 may be of an offset, wedge or hemispheric type. The injector 10 is a type where a predetermined amount of fuel is injected at a high pressure through a fuel injection system. Fuel in a fuel tank 30 is supplied to the injector 10 through a fuel passage 35 having a filter 31, a pump 32 and an accumulator 34 for regulating a fluctuation of the fuel pressure. The fuel returns to the tank 30 through a return passage 36 having a pressure regulator 33. The pressure regulator 33 is applied with a signal from the control unit 50 to control the pressure of fuel. Namely, in a light engine load range, where quantity of air charged into the cylinder 2 is small, the fuel is injected at a low pressure. The fuel pressure increases with an increase of the air quantity as the engine load rises.

The engine 1 is supplied with air through an air cleaner 19, the intake pipe 18 having a throttle valve 20 and a scavenge pump 21. Exhaust gas of the engine 1 is discharged through the exhaust port 11, an exhaust pipe 12 having a catalytic converter 13, and a muffler 14.

The scavenge pump 21 is operatively connected to the crankshaft 5 through a transmitting device 22 comprising an endless belt running over a crank pulley and a pump pulley. The scavenge pump 21 is driven by the crankshaft 5 through the transmitting device 22 for producing a scavenge pressure. The throttle valve 20 is adapted to slightly open the passage of the intake pipe 18 even when an accelerator pedal operatively connected to the throttle valve 20 is released, thus allowing the scavenge pump 21 to induce air. When the accelerator pedal is depressed, the throttle valve 20 is opened accordingly, thereby controlling the quantity of induced air. Hence scavenge pressure generated only by the intake air is supplied to the cylinder 2 for scavenging, so that charging efficiency is increased.

A rotary exhaust valve 15 is provided in the exhaust pipe 12 downstream of the exhaust port 11 adjacent thereto. The rotary valve 15 is operatively connected with the crankshaft 5 through a transmitting device 16 comprising an endless belt running over a crank pulley and a valve pulley so as to be driven by the engine. The rotary valve 15 is adapted to change the valve phase thereof in accordance with the position of the piston 3.

When the piston 3 rises during the compression the exhaust port 11 is closed by the rotary valve 15 at an early stage. Hence it is possible to advance the fuel injection timing, thereby sufficiently mixing the fuel with air in the heavy engine load range.

Figure 2:
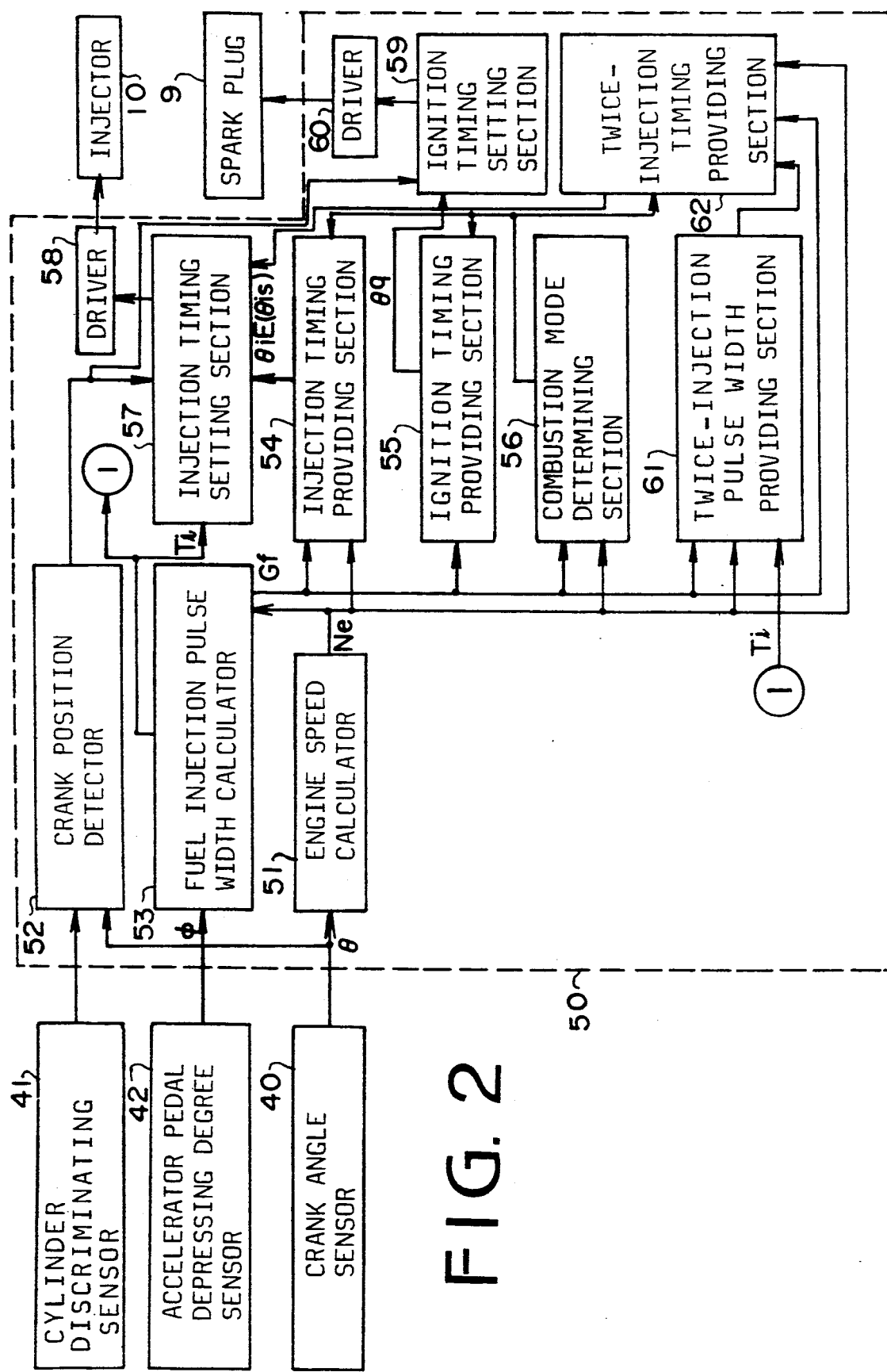
FIG. 2 shows a block diagram showing a control unit according to the present invention.

Referring to FIG. 2, the control system of the present invention has a crank angle sensor 40, a cylinder discriminating sensor 41 and an accelerator pedal depressing degree sensor 42, the output signals of which are fed to the control unit 50. The control unit 50 has an engine speed calculator 51 to which a crank angle $\theta$ from the crank angle sensor 40 is fed to calculate an engine speed Ne based on the time interval between crank pulses, the crank angle $\theta$ and the output signal of the cylinder discriminating section 41 are applied to a crank position detector 52. The crank position detector 52 is designed to detect a predetermined standard crank angle position before the top dead center in each cylinder.

The engine speed Ne and an accelerator pedal depressing degree $\phi$ from the accelerator pedal depressing degree sensor 42 are fed to a fuel injection pulse width calculator 53. The calculator 53 derives a fuel injection quantity Gf from a look-up table in accordance with the engine operating conditions and calculates a fuel injection pulse width Ti in dependency on $$Ti = K \cdot Gf + Ts$$

where K is a coefficient based on a fuel pressure and Ts is voltage correcting value. The engine speed Ne and fuel injection quantity Gf are applied to a combustion mode determining section 56 which determines one of three combustion modes, that is the stratified charge combustion, the homogenous charge combustion and combined mode combustion.

Figure 3A:
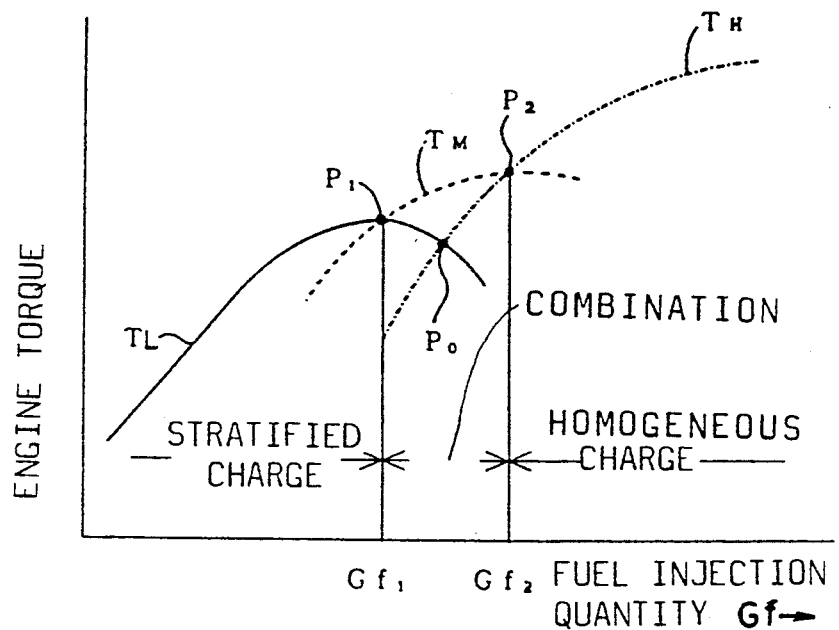
FIG. 3a is a graph showing engine torque characteristics.

FIG. 3a shows a torque curve TL of the stratified charge combustion carried out in a low and middle engine load range and a torque curve TH of the homogeneous charge combustion in a heavy engine load range. The combined mode combustion is performed in a range including a point PO where the torque curves TL and TH intersect. More particularly, the combined mode combustion range is between a point P1 and a point P2. At the point P1, torque curve TL and a torque curve TM of the combined mode combustion intersect and the torque curves TM and TH intersect at the point P2. Thus, when the fuel injection quantity Gf is smaller than a reference quantity Gf1 corresponding to the point P1 (Gf<Gf1), the stratified charge combustion is determined. On the other hand, when the quantity Gf is larger than a reference quantity Gf2 corresponding to the point P2 (Gf≧Gf2), the homogeneous charge combustion is determined. If Gf1≦Gf<Gf2, the combined mode combustion is determined.

The output signal of the combustion mode determining section 56 is fed to an injection timing providing section 54 to which the engine speed Ne and the fuel injection quantity Gf are also applied. The injection timing providing section 54 has a look-up table storing a plurality of fuel injection timings $\theta$iE for the stratified charge combustion and a look-up table storing a plurality of fuel injection timings $\theta$iS for the homogeneous charge combustion, each arranged in accordance with the engine speed Ne and fuel injection quantity Gf. The timings $\theta$iE is retarded in order to perform the stratified charge combustion. However, the fuel injection must end so as to provide a time during which the injected fuel is atomized before the ignition. To the contrary, the timings θiS for the homogeneous charge combustion are advanced so as to start the injection as soon as the exhaust valve is closed. The output signal of the combustion mode determining section 56, engine speed Ne and the fuel injection quantity Gf are further fed to an ignition timing providing section 55. The ignition timing providing section 55 has ignition timing look-up tables for the stratified charge combustion and the homogenous charge combustion, each storing a plurality of ignition timings θg arranged in accordance with the engine speed Ne and fuel injection quantity Gf. The providing section 55 derives the ignition timing θg from the table in accordance with the engine load.

The fuel injection pulse width Ti calculated by the fuel injection pulse width calculator 53 and the injection timing θiE or θiS are applied to an injection timing setting section 57. The setting section 57 produces a fuel injection signal corresponding to the fuel injection pulse width Ti and the injection timing θiE or θiS. The fuel injection signal is fed to the injector 10 through a driver 58 in dependency on the standard crank angle position from the crank position detector 52.

The ignition timing θg provided in the ignition timing providing section 55 is fed to an ignition timing setting section 59 which applies an ignition signal corresponding to the ignition timing θg based on the standard crank angle position and a dwell angle, to the spark plug 9 through the driver 60.

Figure 3B:
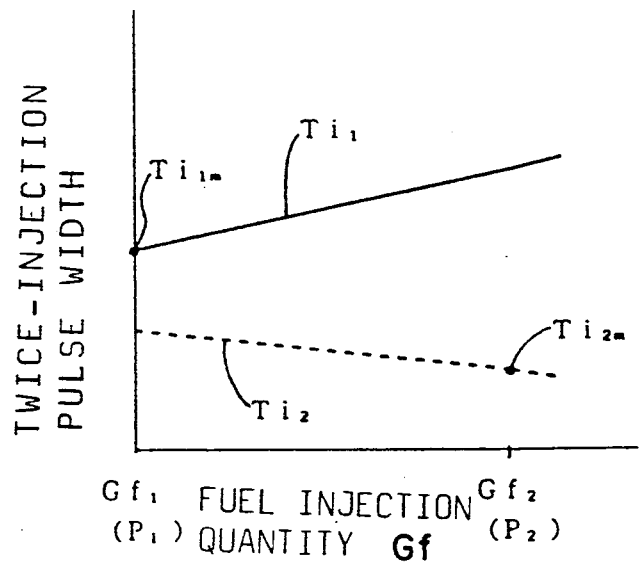
FIG. 3b is a diagram showing fuel injection quantities of first and second fuel injections in the combined mode combustion.

In the combined mode combustion, the fuel is injected at least in twice during the compression. The quantity of fuel at the former injection is increased and the quantity of fuel at the latter injection is decreased as the engine load increases. More particularly, the engine speed Ne, fuel injection quantity Gf and the fuel injection pulse width Ti are applied to a twice-injection pulse width providing section 61 where the pulse width Ti is divided into a former injection pulse width Ti1 and a latter injection pulse width Ti2. As shown in FIG. 3b, at the point P1 corresponding to the fuel injection quantity Gf1, a former injection pulse width Ti1m is set at a minimum necessary quantity for enabling a lean burn with the homogeneous charge. A latter injection pulse width Ti2m at the point P2 corresponding to the fuel injection quantity Gf2 is a minimum necessary quantity to enable a stratified charge combustion. The engine speed Ne, fuel injection quantity Gf, a combined mode combustion signal from the combustion mode determining section 56 and the former and latter injection pulse widths Ti1 and Ti2 are fed to a twice-injection timing providing section 62. The twice-injection timing providing section 62 determines a former injection timing θi1 having the former injection pulse width Ti1 in accordance with the fuel injection starting timing θiS for the homogeneous charge combustion. A latter injection timing θiE for the latter injection pulse width Ti2 is also determined in dependency on the fuel injection ending timing θiE for the stratified charge combustion. The injection timings θi1 and θi2 are fed to the injection timing setting section 57. The ignition timing providing section 55 is provided with an exclusive look-up table storing a plurality of ignition timings θg for the combined mode combustion.

The operation of the two-cycle engine is described hereinafter. During the operation of the engine 1, the piston 3 reaches a position close to the bottom dead center as shown in FIG. 1, so that the scavenge ports 17 open as well as the exhaust port 11. The intake air, quantity of which depends on the opening degree of the throttle valve 20 operated in accordance with the accelerator pedal, is delivered by the scavenge pump 21 into the cylinder 2 through the scavenge ports 17. Consequently, burned gas in the cylinder 2 is scavenged by vertically swirling air so that fresh intake air is admitted at a high charging efficiency. During the compression, the piston 3 rises, from the bottom dead center, closing the scavenge ports 17. At the same time, the exhaust port 11 is closed by the rotary valve 15. The fuel is injected from the injector 10 in accordance with the fuel injection pulse signal from the control unit 50 at a high pressure to form a combustible mixture in the cylinder 2 without the fuel escaping through the exhaust port 11. The pressure of fuel is controlled by the fuel pressure regulator 33 in accordance with the signal from the control unit 50. The mixture is swirled in the combustion chamber with the scavenging air and ignited by the spark plug 9 immediately before the top dead center. After the explosion, the piston 3 descends. Accordingly, the exhaust port 11 is opened so that high pressurized burned gas in the cylinder 2 escapes. The piston 3 further descends, thereby returning to the aforedescribed intake stroke where the cylinder 2 is scavenged.

Meanwhile in the control unit 50, the fuel injection pulse width calculator 53 calculates the fuel injection pulse width Ti based on the fuel injection quantity Gf derived in accordance with the engine speed Ne and the accelerator pedal depressing degree φ. The combustion mode determining section 56 determines the combustion mode in accordance with the fuel injection quantity Gf, thereby providing the injection timing and the ignition timing from the injection timing providing section 54 and the ignition timing providing section 56, respectively.

Figure 4A:
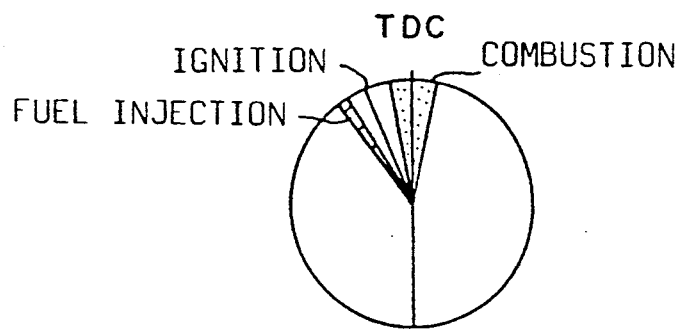
FIGS. 4a to 4c are diagrams showing fuel injection timing and ignition timing in each combustion mode.

In the light and middle engine load range, the look-up table for the stratified charge combustion is selected in the injection timing providing section 54 so that the fuel is injected at the fuel injection pulse width Ti and the timing θiE which is near to the ignition timing θg close to the top dead center. Consequently, as shown in FIG. 4a, a relatively small quantity of fuel is injected toward the plug gap 9a of the spark plug 9 at a latter period of the compression. Immediately after the injection, the ignition signal is applied to the spark plug 9. As a result, the cone shaped fuel spray is ignited at a rear end portion thereof before the fuel is dispersed, thereby achieving the stratified charge combustion. Hence, although the quantity of fuel is small in proportion to the quantity of intake air, the enriched batch of the air-fuel mixture is properly burned to provide a stable combustion.

Figure 4B:
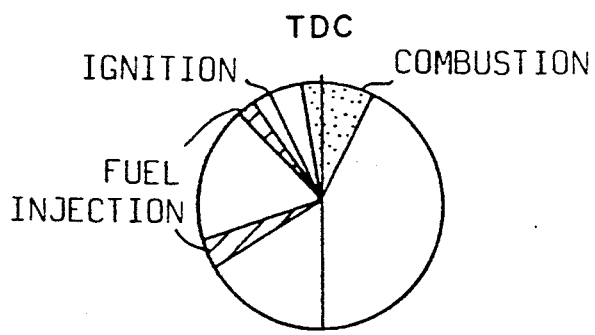
Figure 5A:
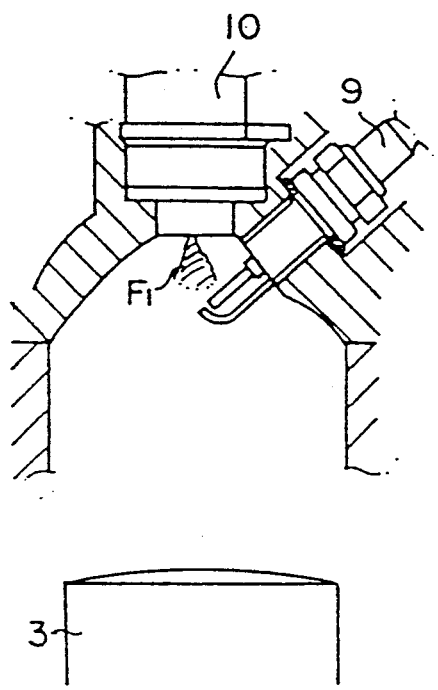
FIGS. 5a to 5e are illustrations explaining the process of the combined mode combustion.
Figure 5B:
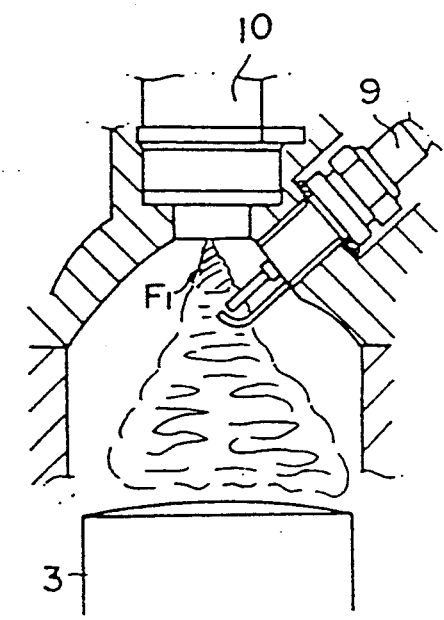
Figure 5C:
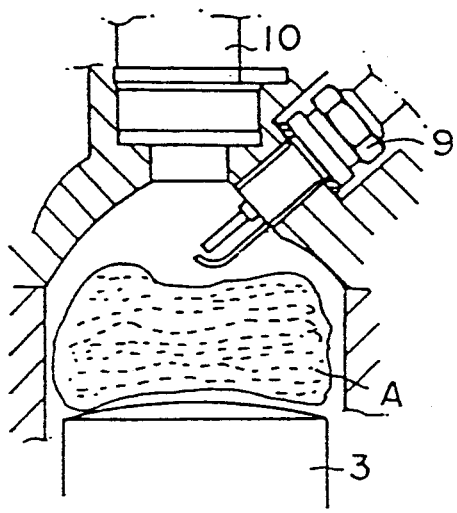
Figure 5D:
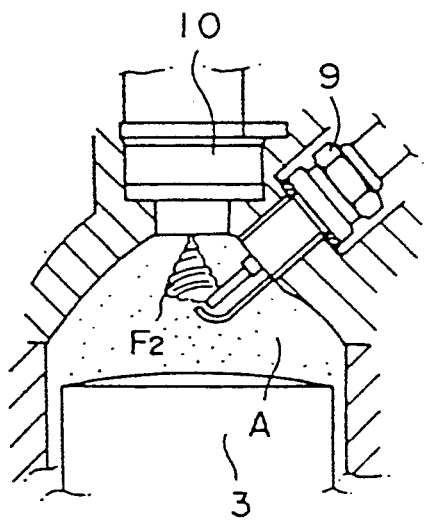
Figure 5E:
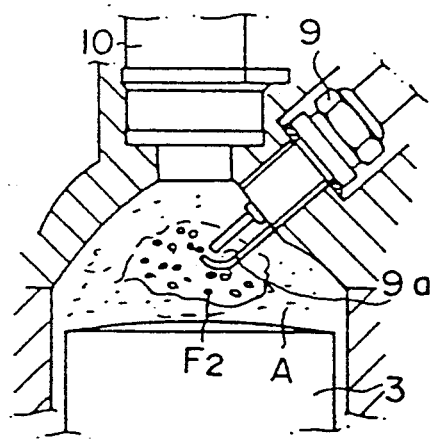

As the engine load increases, the fuel injection quantity Gf is increased so that the combined mode combustion is determined in the combustion mode determining section 56. The former and latter fuel injection pulse widths Ti1 and Ti2 corresponding to the pulse width Ti are determined in the fuel injection pulse widths providing section 61. the respective injection timings θi1 and θi2 in the former period and latter period of the compression are determined in the twice-timing providing section 62 so that the fuel is injected in twice as shown in FIG. 4b. Namely, as shown in FIG. 5a, a minimum necessary quantity of fuel F1 for enabling the lean burn with the homogeneous mixture is injected at the beginning of the compression. After the former injection is completed (FIG. 5b), the fuel is diffused as the piston 3 rises, thereby providing a homogeneous air-fuel mixture A as shown in FIG. 5c. When the piston 3 rises further, a small quantity of fuel F2 is injected into the air-fuel mixture A as shown in FIG. 5d. Immediately thereafter, the mist of fuel F2 is ignited by the spark plug 9 as shown in FIG. 5e. Therefore, the homogeneous air-fuel mixture A including the fuel F1 of the former injection is homogeneously burned, using the fuel F2 of the latter injection as a kindling. With the increase of the engine load, the quantity of fuel of the former injection is increased and the quantity of fuel of the latter injection is decreased. Hence the latter quantity is eventually decreased to a minimum quantity necessary for the stratified charge combustion.

Figure 4C:
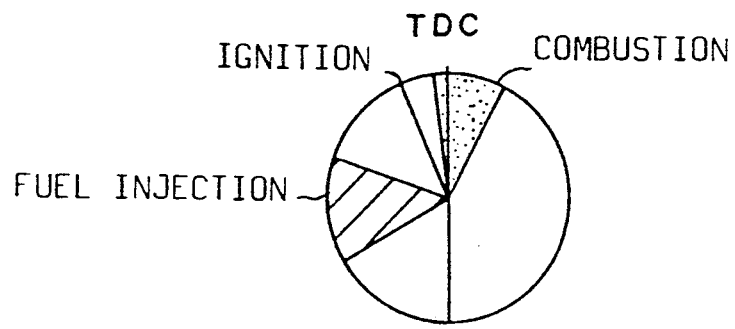

In the heavy engine load range, the fuel injection quantity Gf is increased so that the homogeneous charge combustion mode is determined. The injection timing look-up table for the homogenous charge combustion is selected in the injection timing providing section 54 to derive the fuel injection timing $\theta iS$. The ignition timing $\theta g$ is similarly derived from the table in the ignition timing providing section 55. Therefore as shown in FIG. 4c, a large quantity of fuel is injected from the injector 10 into the cylinder 2 as soon as the rotary valve 15 closes the exhaust port 11. The fuel is sufficiently mixed with intake air during the compression so that, when the spark plug 9 is ignited, the fuel is homogenously burned. Hence the engine torque is increased, owing to the high air mixing effect.

Accordingly, the engine torque shown by the torque curve TL during the stratified charge combustion is smoothly increased to the curve TH of the homogeneous charge combustion through the curve TM of the combined mode combustion. In addition, when the actual torque obtained through the stratified charge and the homogeneous charge changes with the altitude or as a result of lapse of time, the engine torque is still smoothly increased through the combined mode combustion.

The combustion method is changed from the homogenous charge to the stratified charge combustion when the engine load is decreased.

Figure 6:
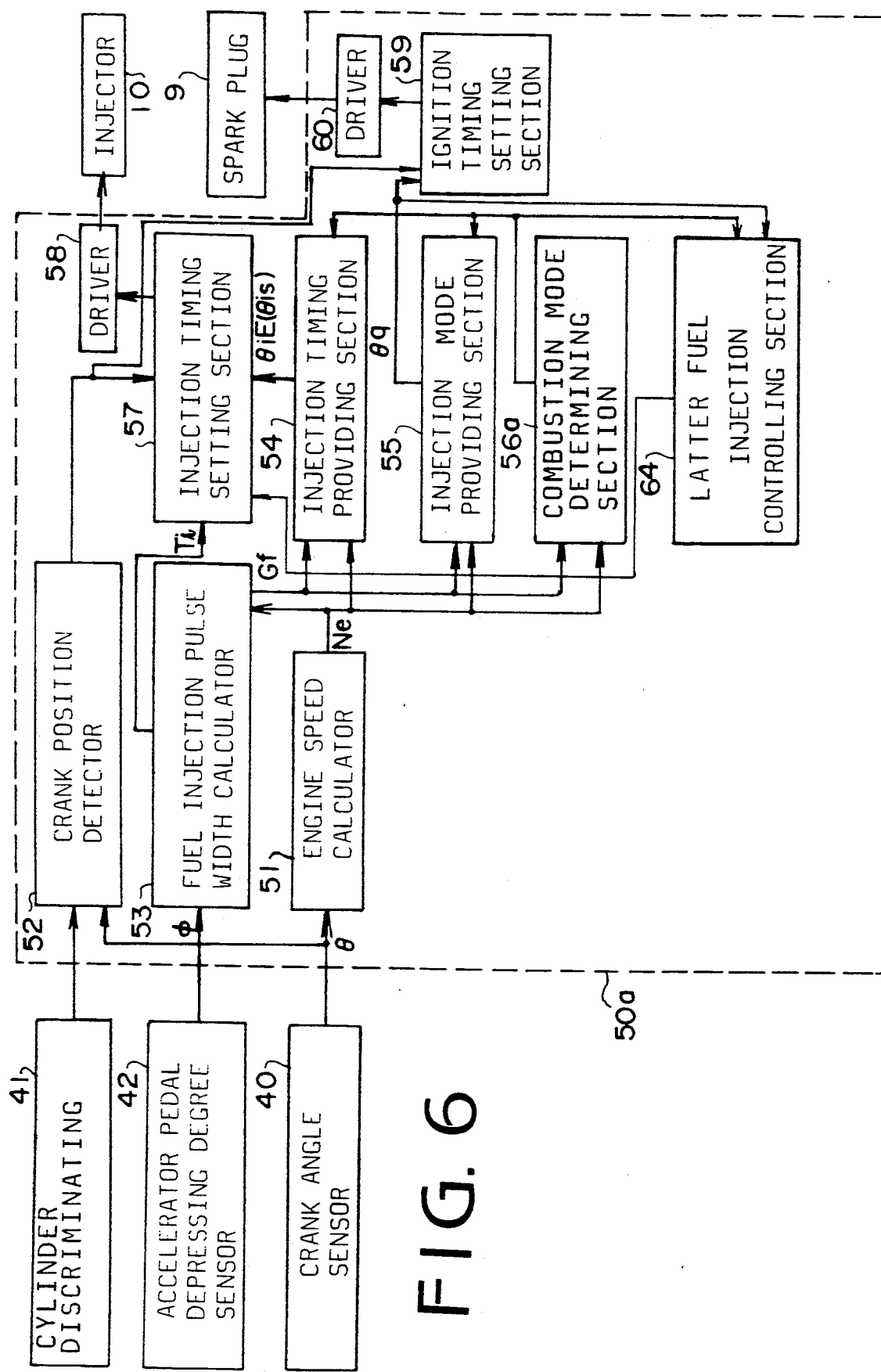
FIG. 6 is a block diagram showing a control unit of a second embodiment of the present invention.

The present invention may be modified to inject the fuel twice in the homogenous combustion mode to improve the ignition characteristics. Referring to FIG. 6, a control unit 50a of the second embodiment has a combustion mode determining section 56a and a latter injection controlling section 64 instead of the combustion mode determining section 56, twice-injection pulse with providing section 61 and the twice-injection timing providing section 62 provided in the control unit 50 shown in FIG. 2. The other constructions are the same as the first embodiment.

The combustion mode determining section 56a compares the fuel injection quantity Gf retrieved in the fuel injection pulse width calculator 53 with a reference quantity Gf0. In the light and middle engine load range, where the fuel injection quantity Gf is smaller than the reference quantity Gf0 (Gf<Gf0), the stratified charge combustion is determined. In the heavy engine load range, where the fuel injection quantity Gf exceeds the reference quantity (Gf≧Gf0), the homogeneous charge combustion is determined.

When the homogeneous charge combustion is selected, the injection timing providing section 54 determines the start timing $\theta iS$ of the former injection, the pulse width Ti of which is calculated by the calculator 53. The ignition timing providing section 55 determines the ignition timing $\theta g$ of the former injection.

The ignition timing $\theta g$ and the output signal of the combustion mode determining section 56a are fed to the latter fuel injection controlling section 64 which feeds a latter fuel injection pulse width Tim and a latter injection ending timing $\theta im$ to the injection timing setting section 57 during the homogeneous charge combustion. The fuel injection pulse width Tim corresponds to a predetermined minimum quantity necessary for the stratified charge without excessively enriching the air-fuel mixture around the plug gap 9a of the spark plug 9 at wide open throttle. The fuel injection ending timing $\theta im$ is so set immediately before the ignition timing $\theta g$ as to give enough time for allowing the fuel of the latter injection to be sufficiently atomized.

Figure 7:
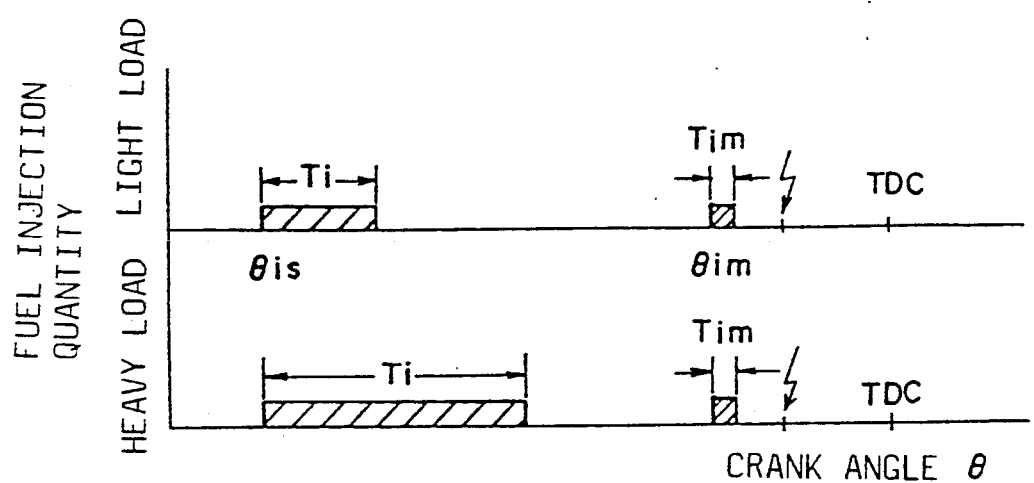
FIG. 7 is a graph showing first and second fuel injections in a homogeneous charge combustion in the second embodiment.

Thus as shown in FIG. 7, in the earlier period of the compression, the former fuel injection starts at the timing $\theta is$ at the pulse width Ti which depends on the engine load. The latter fuel injection is carried out immediately before the ignition at the pulse width Tim. The fuel is mixed with air and ignited through the process already explained with reference to FIGS. 5a to 5e. As a result, the homogeneous air-fuel mixture containing fuel injected at the former injection is reliably ignited in a moment, using the fuel of the latter injection as a kindling, thereby increasing the engine torque because of the high air mixing effect. Although the quantity of the former fuel injection varies in accordance with the engine load, the quantity of the latter fuel injection is constant so that the fuel is properly ignited at every cycle.

From the foregoing, it will be understood that the present invention provides an engine where the combined mode combustion is carried out besides the homogeneous charge combustion and the stratified charge combustion so as to provide smooth engine torque characteristics. During combined mode combustion, the fuel is injected in twice, each injection causing the homogeneous charge and the stratified charge. Hence the engine torque is smoothly increased despite the change in the atmospheric conditions and the deterioration of elements of the system with time. Since an additional sensor is unnecessary, and changing points of the combustion mode are fixed, optimum combustion is easily obtained.

Although the description above is for 2 cycle engine, the control system of the present application can be applied for any types of the internal combustion engines.

While the presently preferred embodiments of the present invention has been shown and described, it is to be understood that these disclosures are for the purpose of illustration and that various changes and modifications may be made without departing from the scope of the invention as set forth in the appended claims.

What is claimed is:

1. A system for controlling fuel injection for an internal combustion engine having at least one cylinder, a fuel injector provided for injecting fuel directly in the cylinder, the system having detector means for detecting engine speed and load on the engine and for producing an operating condition signal, fuel injection quantity determining means responsive to the operating condition signal for determining a quantity of the fuel, injection timing means responsive to the operating condition signal and the quantity of the fuel for determining a timing for injecting the fuel, and driving means for operating the fuel injector to inject the fuel by the fuel quantity at the injection timing, an improvement of the system which comprises:

combustion mode determining means for comparing the fuel quantity with a smaller reference value corresponding to a stratified charge and with a larger reference value corresponding to a homogeneous charge and for producing a combined mode signal when the fuel quantity is between the smaller and larger reference values;

said injection timing means responsive to said engine operating condition signal for determining said injection timing at a latter period of compression for providing the stratified charge when said signal is between a low and middle engine load, and for determining the injection timing at a former period of the compression for providing the homogeneous charge when said signal is a heavy engine load; and twice-injection timing means responsive to said combined mode signal for determining a former injection timing and a latter injection timing in the compression, whereby the fuel is injected in twice to provide a stratified charge combustion and a homogeneous charge combustion.

2. The system according to claim 1, wherein said injection quantity determining means is provided to inject a larger amount of the fuel at the former injection timing, and to inject a smaller amount of the fuel at the latter injection timing.

3. The system according to claim 2, wherein the fuel injection quantity due to the former injection timing increases with the engine load, and the fuel injection quantity due to the latter injection timing reduces with the engine load.

4. The system according to claim 1, further comprising latter injection means for injecting the fuel at a latter period of the compression stroke in the homogeneous charge at the heavy engine load.

* * * * *